(12) United States Patent
Kühnelt et al.

(10) Patent No.: US 7,729,046 B2
(45) Date of Patent: Jun. 1, 2010

(54) SOLID-STATE LASER DEVICE WITH A CRYSTAL ARRAY

(75) Inventors: Michael Kühnelt, Regensburg (DE); Thomas Schwarz, Regensburg (DE); Ulrich Steegmüller, Regensburg (DE); Frank Singer, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 12/170,238

(22) Filed: Jul. 9, 2008

(65) Prior Publication Data

US 2009/0003393 A1 Jan. 1, 2009

Related U.S. Application Data

(62) Division of application No. 11/388,771, filed on Mar. 23, 2006, now abandoned.

(30) Foreign Application Priority Data

Mar. 31, 2005 (DE) ........................ 10 2005 015 148

(51) Int. Cl.
*H01S 5/00* (2006.01)
(52) U.S. Cl. .............................. 359/341.33; 359/341.32; 359/342; 359/349; 372/50.12; 372/70; 372/71; 372/72
(58) Field of Classification Search ............ 359/341.32, 359/341.33, 342, 349; 372/50.12, 70, 71, 372/72
See application file for complete search history.

(56) References Cited

U.S. PATENT DOCUMENTS

| 3,624,545 A | 11/1971 | Ross |
| 4,710,940 A | 12/1987 | Sipes, Jr. |
| 4,841,528 A | 6/1989 | Sipes et al. |
| 5,063,566 A | 11/1991 | Dixon |
| 5,187,714 A | 2/1993 | Okazaki et al. |
| 5,351,259 A | 9/1994 | Ishimori et al. |
| 5,388,114 A | 2/1995 | Zarrabi et al. |
| 5,402,437 A | 3/1995 | Mooradian |
| 5,497,388 A | 3/1996 | Goto et al. |
| 5,802,086 A | 9/1998 | Hargis et al. |
| 5,875,206 A | 2/1999 | Chang |
| 6,069,907 A | 5/2000 | Chang |
| 6,097,540 A | 8/2000 | Neuberger et al. |

(Continued)

FOREIGN PATENT DOCUMENTS

EP 0544825 7/1995

(Continued)

OTHER PUBLICATIONS

European Search Report for European Patent Application No. 06006768.3-2222 dated Jun. 13, 2007.

(Continued)

*Primary Examiner*—Eric Bolda
(74) *Attorney, Agent, or Firm*—Fish & Richardson P.C.

(57) ABSTRACT

In a laser device, a crystal array includes a laser gain crystal and an optically non-linear frequency conversion crystal. A pump source couples at least two mutually spatially separated pump beams into the crystal array. Between two pump beams, a saw kerf of the crystal array extends parallel to the pump beams.

13 Claims, 13 Drawing Sheets

U.S. PATENT DOCUMENTS

| | | |
|---|---|---|
| 6,947,466 B2 * | 9/2005 | Anikitchev et al. ........... 372/75 |
| 2002/0051479 A1 | 5/2002 | Fujikawa et al. |
| 2002/0186731 A1 | 12/2002 | Um et al. |
| 2005/0063441 A1 | 3/2005 | Brown |

FOREIGN PATENT DOCUMENTS

| | | |
|---|---|---|
| EP | 1204182 | 5/2002 |

OTHER PUBLICATIONS

Harrison et al., "Thermal Modeling for Mode-Size Estimation in Microlasers with Application to Linear Arrays in Nd:YAG and Tm,Ho:YLF", *IEEE Journal of Quantum Electronics*, vol. 30, No. 11, pp. 2628-2633 (Nov. 1994).

Rose et al., "Efficient Collection and Manipulation of Laser Diode Output Using Refractive Micro-optics", *SPIE*, vol. 2383, pp. 273-277.

Sipes, D. L. "Highly efficient neodymium:ytrrium aluminum garnet laser end pumped by a semiconductor laser array", Applied Physics Letters, vol. 47, No. 2, pp. 74-76 (Jul. 15, 1985).

* cited by examiner

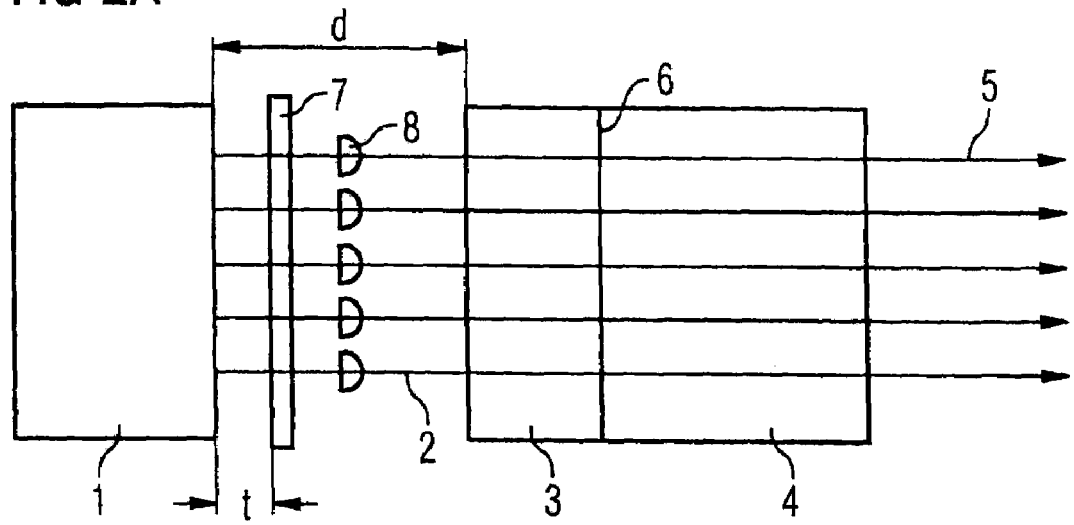
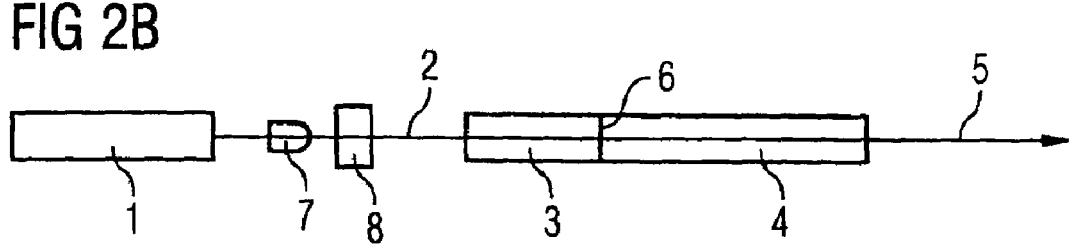
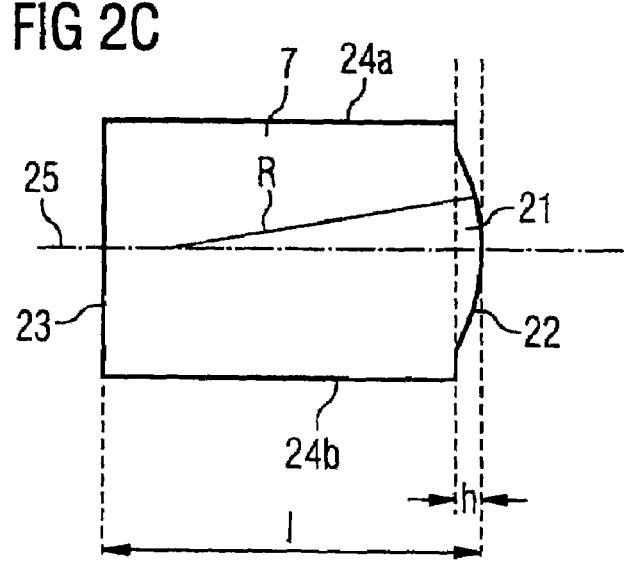

SOLID-STATE LASER DEVICE WITH A CRYSTAL ARRAY

CROSS REFERENCE TO RELATED APPLICATION

This application is a divisional application of U.S. application Ser. No. 11/388,771, filed Mar. 23, 2006, which, pursuant to 35 U.S.C. § 119, claims priority to German Application No. 102005015148.5, filed Mar. 31, 2005. The contents of the prior applications are incorporated herein by reference in their entirety.

TECHNICAL FIELD

The application relates to a laser device.

BACKGROUND

This application relates to a laser device.

An object of at least some embodiments disclosed herein is to specify a laser device that generates electromagnetic radiation of increased output power and preferably increased beam quality.

SUMMARY

According to at least one embodiment, the laser device comprises a crystal array. The crystal array includes at least one crystal, preferably at least two crystals.

The crystals of the array are, for example, connected at mutually confronting end faces. The crystals of the crystal array can be for example glued or bonded to one another. The crystals then form a crystal composite.

The joint between the crystals in such a crystal array is preferably so implemented that electromagnetic radiation—for example laser radiation—traveling through the crystal array can pass through the joint face of one crystal into the adjacent crystal without appreciable losses or changes in direction. That is to say, little or no reflection, absorption or refraction of radiation occurs at the interface between two crystals of the crystal array.

It is also, however, possible for the crystals of the crystal array to be disposed in spaced-apart relation. That is, mutually confronting end faces of the crystal can then have a distance from each other. The end faces preferably extend parallel to each other in this case.

The crystals of the array are for example disposed on a common substrate.

According to at least one embodiment of the laser device, the crystal array comprises a laser gain crystal. The gain crystal is suitable for generating laser radiation when the gain crystal is pumped. For example, the gain crystal is suitable for generating laser radiation in the near infrared region.

According to at least one embodiment of the laser device, the crystal array comprises an optically nonlinear frequency conversion crystal. The frequency conversion crystal is suitable for frequency-converting at least a portion of the electromagnetic radiation passing through it. That is, the frequency of at least a portion of the radiation passing through the frequency conversion crystal is changed, for example increased, during passage through the crystal.

According to at least one embodiment of the crystal array, the laser device comprises a pump source suitable for coupling at least two mutually spatially separated pump beams into the crystal array. For example, in such a case the pump beams propagate into a gain crystal of the crystal array. The pump source is preferably so disposed relative to the crystal array that the pump source faces toward the gain crystal of the crystal array. The pump source is preferably suitable for coupling the pump beams into the crystal array simultaneously. That is, multiple pump beams emitted by the pump source are preferably coupled into the gain crystal of the crystal array simultaneously at different locations. Said pump beams are suitable for optically pumping the gain crystal.

According to at least one embodiment of the laser device, the laser device comprises a crystal array that includes a laser gain crystal and an optically nonlinear frequency conversion crystal. The laser device further has an optical pump source suitable for coupling at least two mutually spatially separated pump beams into the crystal array.

According to at least one embodiment, the crystal array forms a resonator for at least two laser beams. For example, end faces of the crystal array can be implemented reflectively for this purpose. The crystal array then forms a plane-plane resonator for radiation in the crystal array. The crystal array preferably constitutes a resonator for at least two mutually spatially separated laser beams in the crystal array. Such a crystal array preferably constitutes a resonator for the non-frequency-converted portion of the radiation in the crystal array, i.e., for radiation generated in the gain crystal.

The resonator is formed for example by that end face of the gain crystal through which pump radiation can be coupled into the crystal array and by that end face of the frequency conversion crystal through which the laser radiation can be coupled out of the crystal array. A preponderance of the radiation passing through the end face of the frequency conversion crystal is advantageously frequency-converted electromagnetic radiation, preferably laser radiation. The crystals of the array preferably form a crystal composite in this exemplary embodiment. If the crystals are not joined to one another, then mutually confronting end faces of the crystals of the array are preferably rendered highly nonreflective with respect to both the radiation of the fundamental wavelength generated in the gain crystal and the frequency-converted radiation.

The gain crystal is for example provided with a coating at least on its end face through which the pump radiation can be coupled into the crystal array. The coating is preferably highly transmissive of the pump beams. The coating is preferably highly reflective of the fundamental wave excited in the gain crystal. Furthermore, the coating is also preferably highly reflective of the portion of the radiation that has been frequency-converted in the frequency conversion crystal.

At least that end face of the crystal array which is intended to outcouple electromagnetic radiation—for example that end face of the frequency conversion crystal which faces away from the incoupling face of the gain crystal—can be provided with a second coating. The second coating is highly reflective of the fundamental wave generated in the gain crystal and highly transmissive of the frequency-converted radiation. The coated crystal array thereby forms a resonator for the electromagnetic radiation of the fundamental wavelength. The bulk of the frequency-converted radiation can exit through the end face of the crystal array that has been provided with the second coating.

According to at least one embodiment of the laser device, a thermal lens is provided for each laser beam in the crystal array. That is, the plane-plane resonator formed by said crystal array is stabilized by means of one thermal lens for each laser beam in the crystal array. Due to local warming of the crystal array by a beam in the crystal array, changes in refractive index occur in the region of the beam. The areas with different refractive indexes form a gradient lens radially around the beam, stabilizing it.

In other words, each laser beam in the crystal array induces a thermal lens, the combined effect of which stabilizes the resonator and reduces the beam diameter in the resonator to a lateral extent similar to that of the pump beam. The individual laser beams in the crystal array are in this case spaced far enough apart from one another to allow a thermal lens to form at each beam and stabilize the beam. That is, the mutual spacing of the laser beams is so selected that thermal interference among the thermal lenses of adjacent beams is extremely slight. It is possible in this case for the axes of the laser beams to run parallel to one another. However, it is also possible for the directions of the axes of the individual beams to form angles with one another.

According to at least one embodiment of the laser device, the number of laser beams coupled out of the crystal array is equal to the number of pump beams coupled into the crystal array. That is, each pump beam pumps exactly one laser beam in the gain crystal of the crystal array. A portion of each laser beam is frequency-converted in the frequency conversion crystal and exits the crystal array. The number of frequency-converted laser beams exiting the crystal array is then defined by the number of pump beams.

According to at least one embodiment, the frequency conversion crystal is suitable for increasing the frequency of a portion of the electromagnetic radiation coupled into it. The frequency conversion crystal is preferably suitable for at least doubling the frequency of a portion of the electromagnetic radiation propagating through it.

According to at least one embodiment of the laser device, the gain crystal includes at least one of the following crystals: a neodymium-doped yttrium vanadate crystal ($Nd:YVO_4$), a neodymium-doped yttrium-aluminum-garnet crystal (Nd: YAG). The gain crystal is suitable for generating electromagnetic radiation in the near infrared region and emits radiation for example having a wavelength of about 1064 nm. The gain crystal is preferably optically pumped with electromagnetic radiation of smaller wavelengths, for example 808 nm.

According to at least one embodiment of the laser device, the frequency conversion crystal includes at least one of the following crystals: stoichiometric $LiNbO_3$ (SLN), stoichiometric $LiTaO_3$ (SLT), KTP ($KTiOPO_4$), RTP ($RbTiOPO_4$), KTA ($KTiOAsO_4$), RTA ($RbTiOAsO_4$), CTA ($CsTiOAsO_4$). The frequency conversion crystal is preferably suitable for frequency-doubling the radiation passing through it.

According to at least one embodiment of the laser device, the laser device is suitable for generating electromagnetic radiation with a wavelength smaller than 600 nm. The laser device is preferably suitable for generating electromagnetic radiation in the green, blue or ultraviolet region of the spectrum.

According to at least one embodiment of the laser device, the total power of the laser beams coupled out of the laser device is 0.5 W or more. That is, the power of the individual outcoupled frequency-converted beams sums to at least 0.5 W.

According to at least one embodiment of the laser device, the beam path of the pump beams between the pump source and the crystal array is free of optical elements. For example, the pump source and the crystal array are spaced apart from each other in such a way that the pump radiation need not be collimated before entering the crystal array. The distance between the pump source and the crystal array is then preferably no more than 100 μm, particularly preferably no more than 50 μm. The lateral extent of a pump beam in the gain crystal, that is, the extent of the pump beam in directions transverse to the beam direction, can be adjusted by modifying the distance between the pump beam source and the gain crystal. The greater the distance, the larger the pump beam in the gain crystal.

According to at least one embodiment of the laser device, a plane-convex, aspherical cylinder lens is disposed between the pump source and the crystal array. The lens is preferably suitable for fast-axis collimation of the pump radiation (FAC lens). It preferably has a planar light entrance face and an aspherically curved light exit face. The lens can for example contain a GaP-based semiconductor material or be made of such a semiconductor material.

The lens can have an antireflection coating on its light entrance face and/or its light exit face.

According to at least one embodiment of the laser device, an additional lens is disposed between the cylinder lens and the crystal array in the beam path of each individual pump beam. The additional lenses are for example plane-convex cylinder lenses. The additional lenses are preferably suitable for slow-axis collimation and/or focusing of the pump radiation (SAC lens). For example, the slow-axis plane is constituted by the plane of the pump beams emitted by the pump source. The fast-axis plane is then constituted by the plane perpendicular thereto. The slow-axis lenses can be, for example, plane-convex glass lenses with a planar light entrance face and a spherically convexly curved light exit face. The slow-axis lenses can have an antireflection coating on their light entrance faces and/or their light exit faces.

According to at least one embodiment of the laser device, the fast-axis lens and the slow-axis lenses are integrated into a common lens rod. The lenses are for example glued together or bonded to one another for this purpose. Preferably only the light entrance face of the fast-axis lens and the light exit face of the slow-axis lenses have an antireflection coating in this case.

According to at least one embodiment of the laser device, the pump source comprises a wide strip diode laser (diode laser bar). The pump source is preferably suitable for generating at least two laser beams extending parallel to one other. That is, the axes of the pump beams preferably extend parallel to one another. The pump source is preferably suitable for generating the laser beams simultaneously. The laser beams can in this case be generated by the pump source either in cw mode or in pulsed mode. Particularly preferably, the pump source is suitable for simultaneously generating a plurality of laser beams extending parallel to one another, for example five or more laser beams.

According to at least one embodiment of the laser device, the diameter of one of the laser beams generated by the pump beam source is no more than 150 μm. The beam diameter is preferably no more than 100 μm, particularly preferably no more than 50 μm.

According to at least one embodiment, the crystal array comprises a saw kerf between every two pump beams coupled into the crystal array. The saw kerf preferably runs parallel to the pump beams. Particularly preferably, saw kerfs extend over the full length of the crystal array. The saw kerfs are suitable for thermally decoupling from one another the individual laser beams in the resonator formed by the crystal array. That is, the saw kerfs help to prevent the thermal lenses stabilizing the resonator from being negatively affected by thermal interference for example from adjacent beams in the resonator. The deeper and wider the saw kerfs are selected to be, the better the thermal decoupling, and the smaller the distance between adjacent beams can be selected to be.

The distance between the saw kerfs is governed in this case by the distance between the pump beams. The distance between the saw kerfs is preferably between 350 and 500 µm, particularly preferably between 400 and 500 µm. The width of the saw kerfs is preferably between 100 and 200 µm, particularly preferably between 125 and 175 µm, for example about 150 µm.

According to at least one embodiment of the laser device, the crystal array is disposed on a substrate containing at least one of the following materials: copper, a copper composite material (e.g. DBC, direct-bonded copper), silicon. It is further possible for the substrate to contain or be formed of another material that is a good thermal conductor.

At least one of the following fasteners is preferably disposed between the crystal array and the substrate: glue, soft solder, hard solder. The crystal array is preferably connected mechanically fixedly to the substrate by the fastener.

According to at least one exemplary embodiment of the laser device, the substrate comprises at least one recess. Said recess can be for example a channel configured as U- or V-shaped in cross section. The recess is preferably suitable in shape and size for at least partially receiving the crystal array. This means that the recess is for example so deep that a portion of the crystal array is disposed in the recess and another portion of the crystal array juts above the edge of the recess. The crystal array can in this case be fastened in the recess of the substrate by means of one of the above-described fasteners.

According to at least one exemplary embodiment of the laser device, the heat-conducting element comprises at least one recess. Said recess can be for example a channel configured as U- or V-shaped in cross section. The recess is preferably suitable in shape and size for at least partially receiving the crystal array. This means that the recess is for example so deep that a portion of the crystal array is disposed in the recess and a portion of the crystal array juts above the edge of the recess. The crystal array can for example be fastened in the recess of the substrate by means of one of the above-described fasteners.

According to at least one embodiment of the laser device, a filling material is placed in the saw kerfs of the crystal array. Said filling material is preferably a fastener by which the crystal array is mechanically fastened to the substrate and/or to the heat-conducting element. Particularly well suited for use as such a filling material is, for example, an epoxy material containing thermally conductive fillers such as for example metal particles.

According to at least one embodiment of the laser device, the substrate and/or the heat-conducting element comprise at least one protrusion, configured for example as comb-like. The protrusion is preferably suitable for engaging in a saw kerf of the crystal array. The comb-like protrusion is preferably fastened mechanically in the saw kerf by means of one of the above-described filling materials or one of the above-described fasteners.

The number of protrusions on the substrate and/or on the heat-conducting element is preferably at least equal to the number of saw kerfs in the crystal array. Preferably exactly one protrusion engages in each saw kerf. Particularly preferably, each protrusion extends over the full length of the associated saw kerf, so that a protrusion engages in every saw kerf of the crystal array.

According to at least one embodiment of the laser device, a heat-conducting element is disposed on the crystal array. The heat-conducting element is for example disposed on the surface facing away from the substrate. The heat-conducting element preferably contains or is formed of at least one of the following materials: copper, a copper composite material (e.g. DBC, direct-bonded copper), silicon. It is further possible for the heat-conducting element to contain or be formed of another material that is a good thermal conductor. At least one of the following fasteners is preferably disposed between the crystal array and the heat-conducting element: glue, soft solder, hard solder. Particularly preferably, the crystal array is connected mechanically fixedly to the substrate by the fastener.

According to at least one embodiment of the laser device, disposed after the crystal array is at least one concave mirror. That is, for example disposed after the radiation exit face of the frequency conversion crystal is a concave mirror whose curvature is oriented away from the frequency conversion crystal. The radiation exit face of the frequency conversion crystal is in this case highly transmissive of the laser radiation of the fundamental wavelength generated in the gain crystal. The concave mirror is preferably highly reflective of the radiation of the fundamental wavelength and highly transmissive of the frequency-converted portion of the radiation. The concave mirror and the radiation entrance face of the gain crystal, facing the pump source, preferably form a resonator for the laser radiation generated in the gain crystal. For example, in this case exactly one concave mirror is assigned to each laser beam. The concave mirrors can for example be configured as a coherent strip. That is to say that they are integral, i.e., fabricated in one piece.

The described laser device preferably finds application in one of the following devices: printer, lighting system, copier, scanner, projector, display device.

The here-described laser device is explained in more detail below with reference to exemplary embodiments and the related figures. Accordingly, other aspects, features, and advantages follow.

DESCRIPTION OF DRAWINGS

In the exemplary embodiments and figures, like or like-acting elements are provided with the same respective reference numerals. The elements shown are not to be considered true to scale; rather, individual elements may be depicted as exaggeratedly large to provide a better understanding.

FIG. 2A is a schematic plan view of a second exemplary embodiment of the laser device.

FIG. 2B is a schematic sectional diagram of the second exemplary embodiment of the laser device.

FIG. 2C is a detail view from FIG. 2B.

DETAILED DESCRIPTION

Figure 1A:
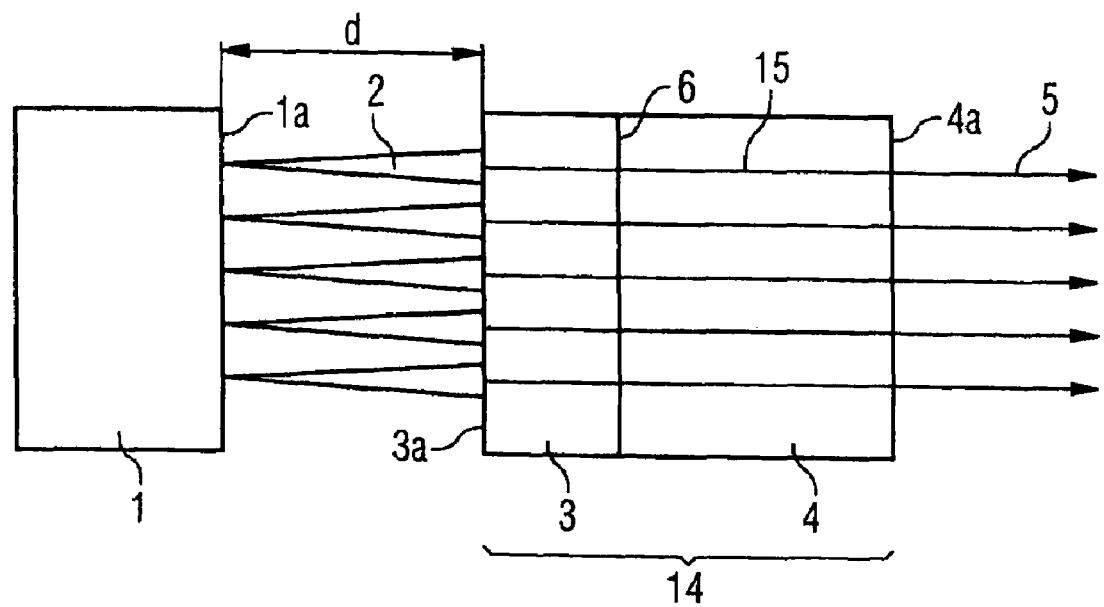
FIG. 1A is a schematic plan view of a first exemplary embodiment of the laser device.
Figure 1B:
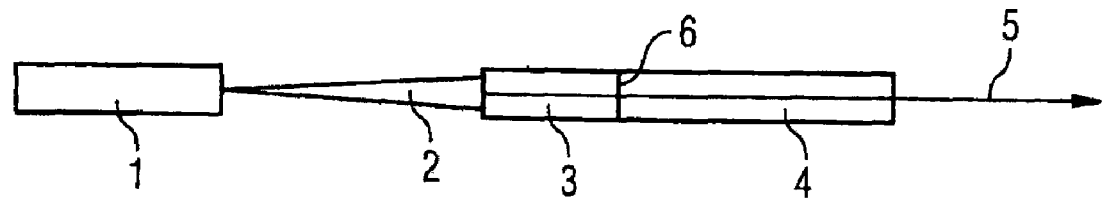
FIG. 1B is a schematic sectional diagram of the first exemplary embodiment of the laser device.

FIG. 1A is a schematic plan view of a first exemplary embodiment of the here-described laser device. FIG. 1B is the associated schematic sectional diagram in side elevation.

The laser device comprises a pump source 1. Pump source 1 is constituted for example by a series arrangement of three wide-strip diode lasers (diode laser bars). The diode lasers are suitable for emitting electromagnetic radiation in a wavelength range that can be greatly absorbed in the gain crystal 3. In the present exemplary embodiment, the pump source emits a multiplicity of laser beams 2 extending parallel to one another and having a wavelength of, for example, 808 nm. The distance between the pump beams 2 is preferably between 400 and 500 μm. The emitter width, that is, the extent of the beam 2 in the lateral direction, is preferably no more than 150 μm on exit from the pump source.

If no further optical element is disposed between pump source 1 and gain crystal 3, as is the case in the first exemplary embodiment, the emitter width is preferably no more than 100 μm, particularly preferably between 30 and 50 μm.

The distance between the pump source and the gain crystal is in this case preferably no more than 100 μm, particularly preferably no more than 50 μm.

The laser or gain crystal 3 is formed for example by an Nd:YVO$_4$ crystal or an Nd:YAG crystal. The gain crystal 3 is suitable for generating electromagnetic radiation in the near infrared, for example having a wavelength of 1064 nm.

In the exemplary embodiment of FIGS. 1A and 1B, gain crystal 3 and frequency conversion crystal 4 are connected to form a crystal composite. This means that gain crystal 3 is mechanically fixedly connected, by its face turned away from radiation entrance face 3a, to a frequency conversion crystal 4. For example, gain crystal 3 and frequency conversion crystal 4 are fixedly connected to each other at interface 6 by gluing or bonding.

In the exemplary embodiment shown, frequency conversion crystal 4 is constituted by a KTP crystal suitable for frequency-converting the electromagnetic radiation generated by laser crystal 3, preferably for doubling the frequency of that radiation.

Gain crystal 3 and frequency conversion crystal 4 together form the crystal array 14. Crystal array 14 forms a laser resonator for the electromagnetic radiation of the fundamental wavelength generated in laser crystal 3.

To this end, radiation entrance face 3a is provided with a first coating. The first coating is highly transmissive of the pump radiation 2. The transmissivity is preferably 95 percent or more for radiation with a wavelength of 808 nm.

In addition, the first coating is highly reflective of the electromagnetic radiation of the fundamental wavelength generated in gain crystal 3. For example, the reflectivity is 99.5 percent or more for a wavelength of 1064 nm.

The first coating is preferably highly reflective of the radiation frequency-converted in the frequency conversion crystal, the reflectivity being 95 percent or more at a wavelength of 532 nm.

Radiation exit face 4a is preferably provided with a second coating. The second coating is preferably highly reflective of the radiation of the fundamental wavelength generated in the gain crystal. The reflectivity is preferably 99.5 percent or more at a wavelength of 1064 nm.

The second coating is also preferably highly transmissive of the radiation frequency-doubled in the frequency conversion crystal. The transmissivity is, for example, 95 percent or more at a wavelength of 532 nm.

Radiation entrance face 3a and radiation exit face 4a form an optical plane-plane resonator. Thus, laser radiation 15 that circulates in crystal array 14 originates in gain crystal 3. A portion of this circulating radiation is converted in frequency conversion crystal 4 into radiation of, for example, doubled frequency. This for example green laser light 5 leaves the crystal array through radiation exit face 4a.

The number of laser beams 15 in crystal array 14 is preferably equal to the number of pump beams 2. Preferably, each laser beam 15 in crystal array 14 is optically pumped by exactly one pump beam 2. The number of frequency-converted laser beams 5 that leave the crystal array through radiation exit face 4a is then equal to the number of laser beams 15 generated in the crystal array, and thus to the number of pump beams 2.

The plane-plane resonator formed by the coated side faces 3a and 4a is here stabilized by a thermal lens effect for each laser beam 15 in crystal array 14. That is, due to the thermal action of a laser beam 15 in the crystal array, a thermally induced change in refractive index occurs radially around said laser beam 15. The radial change in refractive index forms a gradient lens that stabilizes the resonator and reduces the beam diameter in the resonator to a value similar to the diameter of a pump beam 2 in gain crystal 3. That is, the pump beams 2 and the laser beam 15 preferably have approximately the same lateral extent. This is true of all the beams 15 in the crystal array. The power, spacing and diameter of the pump beams 2 must be so selected in this case that the individual beams 15 in the crystal array do not have too strong a thermal influence on one another.

Figure 1C:
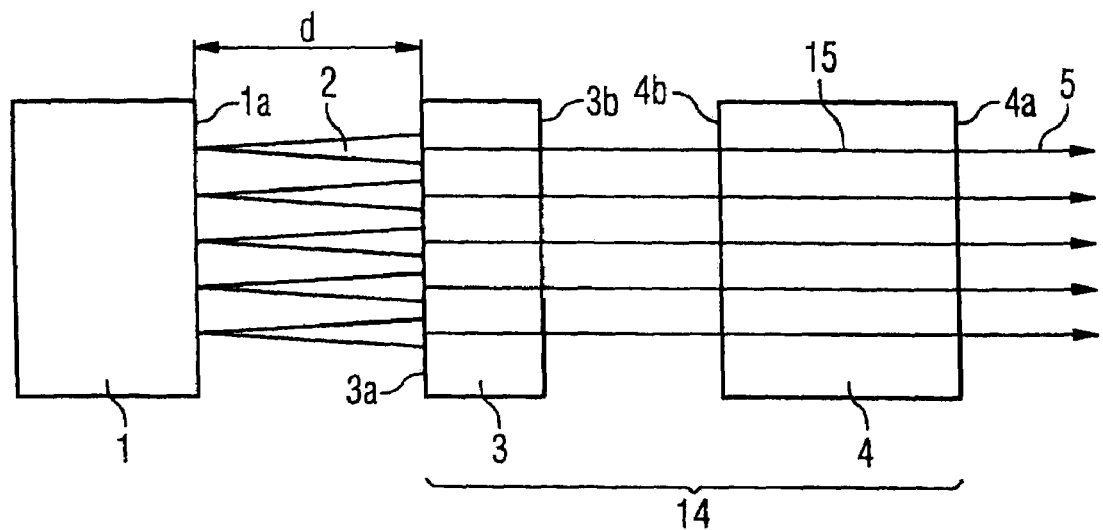
FIG. 1C is a schematic plan view of a first modification of the first exemplary embodiment of the laser device.

FIG. 1C is a schematic plan view of a first modification of the first exemplary embodiment of the laser device.

Here, gain crystal 3 and frequency conversion crystal 4 are not connected to each other, but are disposed in spaced-apart relation. The radiation exit face 3b of gain crystal 3 and the radiation entrance face 4b of frequency conversion crystal 4 are preferably in this case highly transmissive of the electromagnetic radiation of the fundamental wavelength generated in gain crystal 3 and the radiation frequency-converted in the frequency conversion crystal. For example, the transmissivity for both wavelengths is preferably 99.8 percent or more. That is, the faces have been rendered highly nonreflective with respect to radiation of both wavelengths.

The illustrated spaced-apart arrangement of gain crystal 3 and frequency conversion crystal 4 can also be used in the following exemplary embodiments.

Figure 1D:
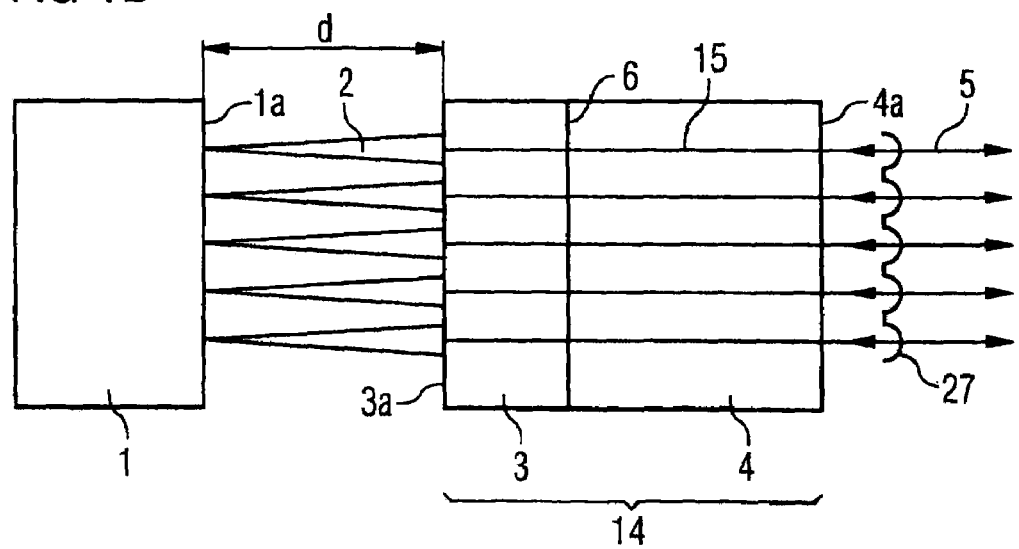
FIG. 1D is a schematic plan view of a second modification of the first exemplary embodiment of the laser device.

FIG. 1D is a schematic plan view of a second modification of the first exemplary embodiment of the laser device.

Here, a series arrangement of concave mirrors 27 is disposed after radiation exit face 4a of the frequency conversion crystal. Preferably exactly one concave mirror 27 is assigned to each laser beam 15 in this case. The concave mirror 27 is preferably highly reflective of the electromagnetic radiation of the fundamental wavelength generated in gain crystal 3 and highly transmissive of the radiation frequency-converted in the frequency conversion crystal. The radiation exit face 4a of frequency conversion crystal 4 is in this case preferably coated to render it highly transmissive of the electromagnetic radiation of the fundamental wavelength generated in gain crystal 3 and the radiation frequency-converted in the frequency conversion crystal. For example, the transmissivity for both wavelengths is preferably 99.8 percent or more. That is, the surface has been rendered highly nonreflective with respect to radiation of both wavelengths.

The concave mirrors 27, respectively, and the radiation entrance face 3a of gain crystal 3 form a resonator for each laser beam 15. The concave mirrors are preferably fashioned as a coherent strip. The strip can for example be fashioned integrally and/or in one piece. The spaced-apart arrangement of gain crystal 3 and frequency conversion crystal 4 illustrated in FIG. 1C is particularly preferred in this exemplary embodiment.

The arrangement of concave mirrors 27 can also be used in the following exemplary embodiments.

FIG. 2A is a schematic plan view of a second exemplary embodiment of the here-described laser device. FIG. 2B shows the associated sectional diagram in side elevation. In contrast to the exemplary embodiment of FIG. 1, disposed in the beam path of pump beam source 1 are optical elements 7, 8, suitable for reducing the divergence of the pump beams 2 and/or modeling the emitter with smaller dimensions. Optical elements 7, 8 are preferably suitable for generating a pump beam 2 of predefinable size in gain crystal 3. The distance d between pump source 1 and crystal array 14 can then be selected as correspondingly greater.

To collimate the pump radiation in the fast-axis direction—vertical to the plane formed by the pump beams 2—for example a common plane-convex cylinder lens can be used for all the pump beams 2.

FIG. 2C is a schematic sectional diagram of the cylinder lens 7 in side elevation.

The lens 7 has for example a radiation entrance face 23. Disposed opposite radiation entrance face 23 is a convexly curved region 21 having a height h. This convexly curved region can extend over the entire face of the lens that is opposite radiation entrance face 23. It is also possible, however, for the convexly curved region to occupy only part of that face, as illustrated in FIG. 2C.

Convexly curved region 21 is terminated by aspherical face 22, which forms the radiation exit face of the lens. The distance between radiation entrance face 23 and the apex of aspherical, convexly curved face 22 is identified as the thickness 1 of the lens. For example, the apex of the curved face is here disposed on the optical axis 25 of the lens.

Radiation entrance face 23 and the face of lens 7 that includes convexly curved region 21 are connected to each other by planar side faces 24a and 24b. One of these side faces, for example side face 24b, serves as the mounting face of the lens, by which the lens can for example be fastened to a substrate. During the mounting of the lens 7, the opposite side face 24a can serve for example as the suction surface for a vacuum tweezers for mounting the lens 7.

The lens 7 contains for example GaP or a GaP-based semiconductor material such as, for example, InGaP or InGaAlP. It is also possible, however, for lens 7 to contain a high-refraction glass. The lens can either contain or be composed of one of these materials. For example, for electromagnetic radiation in the wavelength range of about 800 to 950 nm, GaP has a refractive index of about 3.10 to 3.14.

An antireflection coating (not shown) can for example be applied to radiation entrance face 23 and aspherical face 22. The antireflection coating can for example be matched to the wavelength of the electromagnetic radiation for which the lens is intended. The antireflection coating is for example fashioned as a single layer, which may for example contain $SiN_xO_y$. It is also possible for the antireflection coating to be implemented as a sequence of plural layers. For example, the antireflection coating can include one layer containing tantalum pentoxide and another layer containing aluminum oxide ($Al_2O_3$). Preferably, the antireflection coating is for example vapor-deposited on the surface of the lens while it is still on-wafer.

The fabrication of the lens 7 can take place for example by etching the lens structure on-wafer followed by singulation, for example by sawing.

To produce aspherical face 22, for example first a photoresist layer is created on a lens substrate. The photoresist layer is then structured to form a resist lens. The structure of the photoresist lens can then be transferred at least partially to the underlying lens substrate by an anisotropic etching process, such as for example reactive ion etching.

Also suitable are etching processes such as anodically coupled plasma etching in a parallel plate reactor, triode-reactive ion etching, inductively coupled plasma etching or similar methods. The production methods used preferably involve plural gas components of differing selectivity with respect to the photoresist layer and the lens substrate. "Selectivity" here denotes the ratio of the etch rate of the lens substrate to the etch rate of the photoresist. With a selectivity of 1, for example, the shape of the resist lens is transferred to the lens substrate substantially unchanged. A selectivity of >1, on the other hand, results in a greater height for the etched semiconductor lens than that of the photoresist lens. Thus, the selectivity of the etching process, together with the initial shape of the resist lens, determines the shape of the lens 7 produced.

The shape of the aspherical face 22 of the lens 7 is described in this case by the rotational asphericality of an axially symmetrical curve y, stated as follows:

$$y = \frac{x^2}{R\left(1 + \sqrt{1 - \frac{(1+c)x^2}{R^2}}\right)}.$$

Depending on the choice of lens parameters such as the radius of curvature R, the asphericality factor c, the lens thickness 1 and the height h of the convexly curved region 21, it is possible to fabricate a plane-convex, aspherical lens 7 having the desired collimation and the desired numerical aperture.

The characteristics of the lens 7 are adapted for example to the use requirements of the lens 7 in the laser device.

The radiation outcoupling face 1a of pump source 1 is located in this case at a working distance t from the radiation entrance face 23 of the lens 7. The lens 7 is suitable for reducing the divergence of the electromagnetic radiation generated by the semiconductor chip. To this end, immediately upon entry the pump radiation 2 is refracted at radiation entrance face 23 to the optical axis 25 of the lens 7. Further refraction to the optical axis occurs as the radiation exits through aspherical face 22. In this case the numerical aperture of the semiconductor chip is, for example, between 0.75 and 0.85, preferably 0.8.

According to an exemplary embodiment of the laser array [sic], assuming a lens thickness 1 of about 450 µm, a working distance of t=75 µm between the pump source and the lens is selected. A numerical aperture of about 0.82 can be obtained for example by choosing a radius of curvature of R=−454 µm and an asphericality factor of c=−2.539. The height h of the curved region of the lens 7 is then 50 µm.

To collimate and/or focus the pump radiation in the slow-axis direction—in the plane of the pump beams 2—it is possible to use one plane-convex cylinder lens 8 for each beam 2. The lenses 8 can be formed for example of glass. They preferably have planar radiation entrance faces and spherically convexly curved radiation exit faces. The radiation entrance faces and/or radiation exit faces can be provided with an antireflection coating as described earlier hereinabove.

It is also, however, possible for the slow-axis lenses, like the fast-axis lenses, to be formed of a GaP-based semiconductor material or to contain such a material. The radiation exit faces of the slow-axis lenses can then be spherically or aspherically convexly curved. In principle, the slow-axis lenses can be fashioned in the form of a fast-axis lens rotated horizontally by 90 degrees, as described hereinabove.

It is further possible for lens 7 and lenses 8 to be integrated into a common lens rod (not shown). That is, the radiation exit face of lens 7 is mechanically fixedly connected to the radiation entrance faces of lenses 8. This eliminates the need for an antireflection coating at the interface between lens 7 and lens 8.

The pump optics 7, 8 preferably focuses each individual emitter of the pump laser bar on a directly assigned, to-be-pumped region of gain crystal 3. It is also possible, however, for the pump optics to be suitable for mixing the light from the pump source and then producing a series of discrete pump regions again in the gain crystal 3. For example, the pump source 1 can generate exactly one laser beam, which is divided by the pump optics 7, 8 into a plurality of pump beams 2.

Figure 3A:
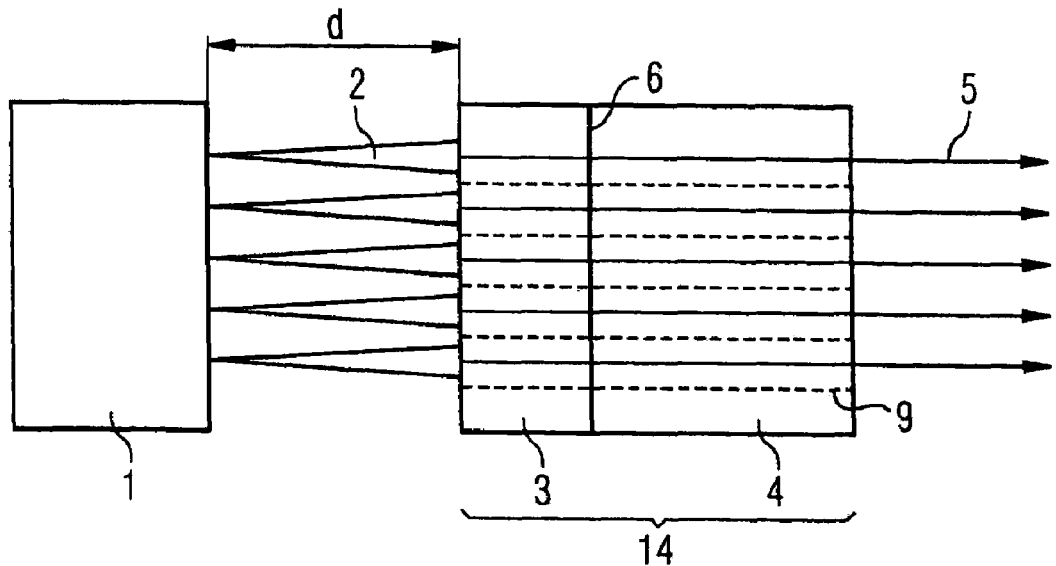
FIG. 3A is a schematic plan view of a third exemplary embodiment of the laser device.
Figure 3B:
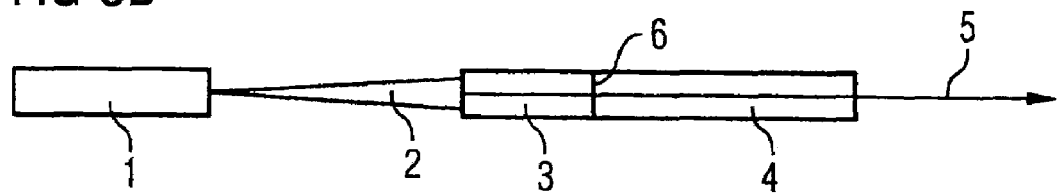
FIG. 3B is a schematic sectional diagram of the third exemplary embodiment of the laser device.

FIG. 3A is a schematic plan view of a third exemplary embodiment of the here-described laser device. FIG. 3B is the associated sectional diagram in side elevation.

Figure 3C:
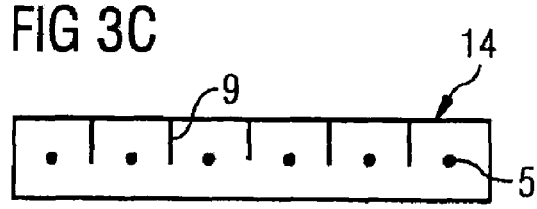
FIGS. 3C and 3D are detail views from FIG. 3A according to two different modifications of the third exemplary embodiment of the laser array [sic].
Figure 3D:
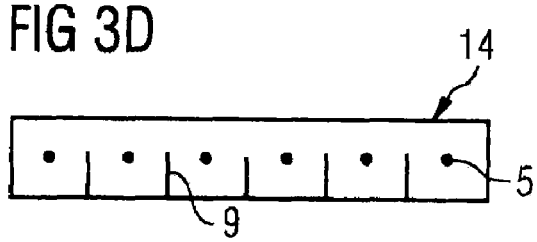

In contrast to the exemplary embodiment of FIGS. 1a and 1B, here saw kerfs 9 extending along the laser beams 15 are disposed in the crystal array 14. The saw kerfs serve to thermally decouple the individual beams 15 from one other. This improves the decoupling of the thermal lenses of the individual beams 15 from one another. The wider and deeper these saw kerfs 9 are chosen to be, the better the thermal decoupling of the individual regions of the laser device defined by the saw kerfs 9. The saw kerfs 9 are preferably about 150 µm wide. Saw kerfs in this configuration preferably run parallel to the laser beams 15 in the crystal array. It is important in this exemplary embodiment that the crystal array 14 can be preserved as a coherent object. That is, the saw kerfs 9 do not completely sever any crystals from the array. The crystal array 14 can be mounted with the sawed-into faces up (see the front view of FIG. 3C) or down (see FIG. 3D).

Figure 4A:
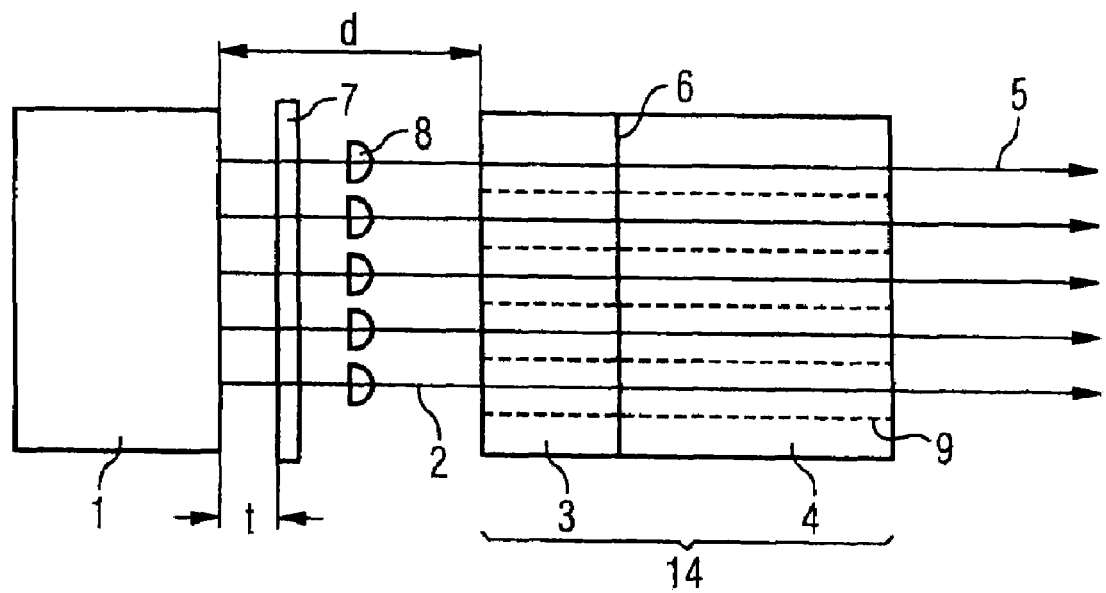
FIG. 4A is a schematic plan view of a fourth exemplary embodiment of the laser device.
Figure 4B:
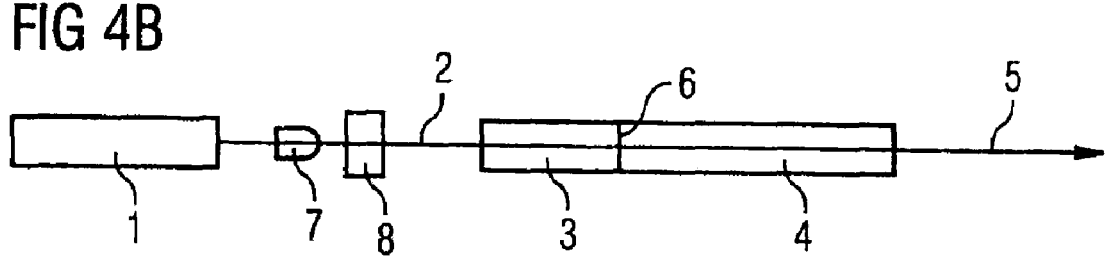
FIG. 4B is a schematic sectional diagram of the fourth exemplary embodiment of the laser device.

FIG. 4A is a schematic plan view of a fourth exemplary embodiment of the laser device. FIG. 4B is the associated sectional diagram in side elevation.

In contrast to the exemplary embodiment of FIGS. 2A and 2B, here the saw kerfs 9 of the exemplary embodiment of FIGS. 3A and 3B are disposed between the individual laser beams 15.

Figure 5A:
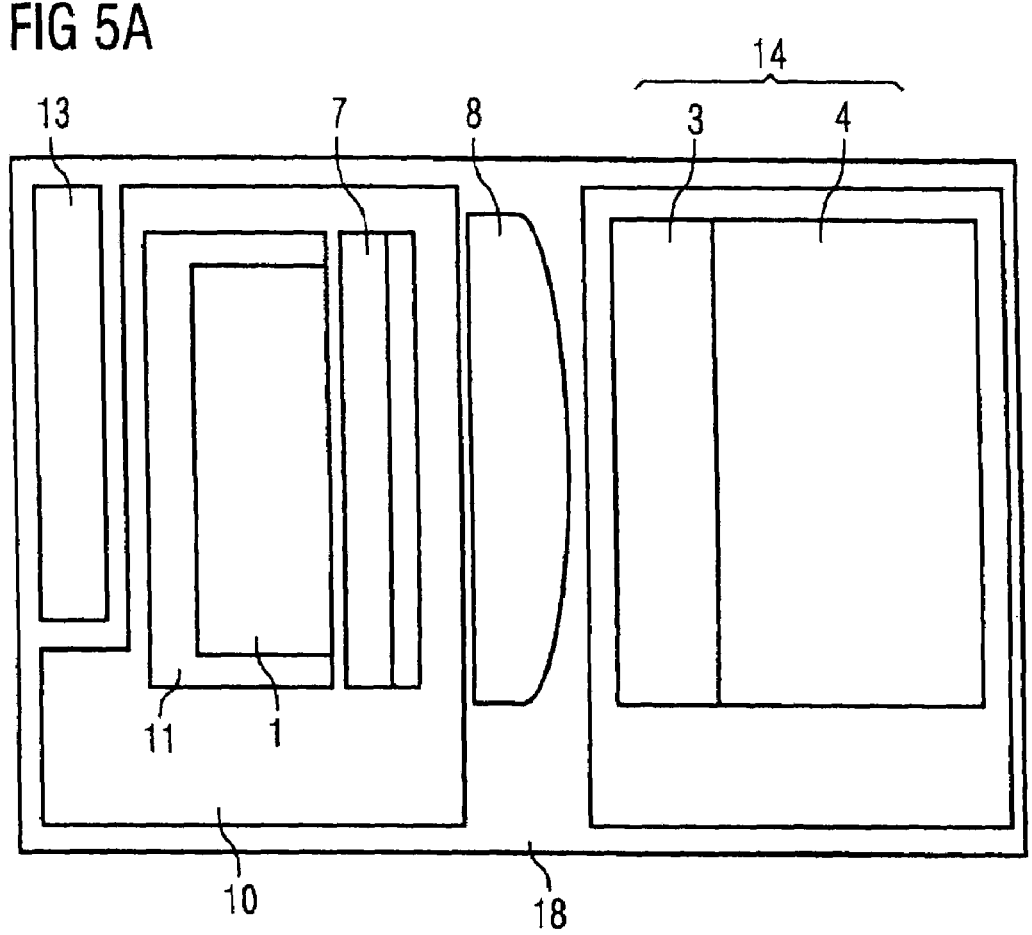
FIG. 5A is a schematic plan view of a fifth exemplary embodiment of the laser device.
Figure 5B:
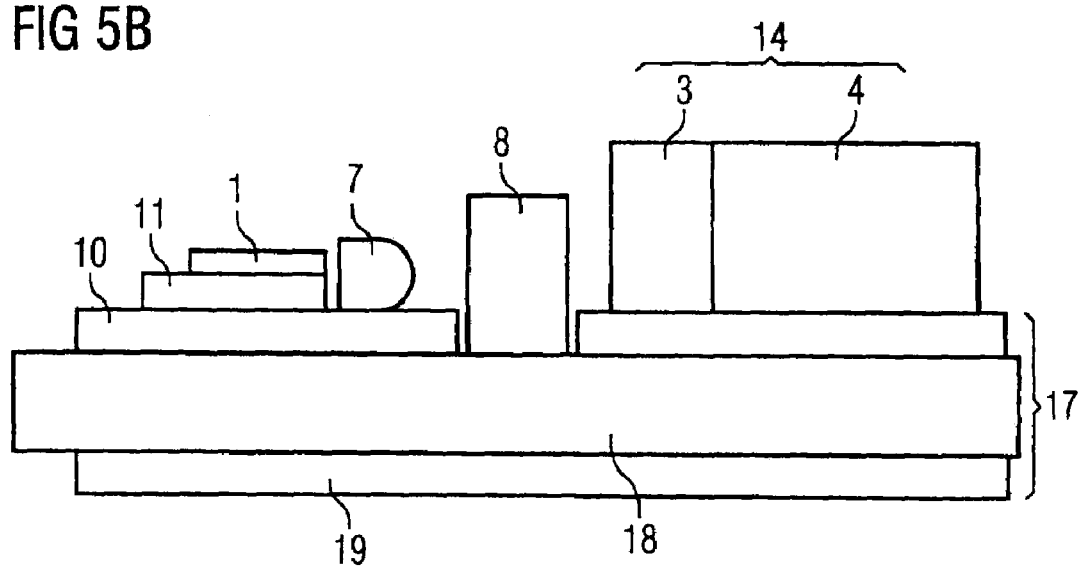
FIG. 5B is a schematic sectional diagram of the fifth exemplary embodiment of the laser device.

FIG. 5A shows a fifth exemplary embodiment of the here-described laser device in a schematic plan view. FIG. 5B is the associated sectional diagram in side elevation.

The pump beam source 1 is fastened to a heat sink 11, for example by means of a hard solder such as AuSn. The pump source 1 can be electrically contacted by means of electrical connection region 13. The heat sink 11 is for example also mounted on a circuit board 17 by means of a hard solder. The circuit board 17 contains a ceramic layer 8, a top copper layer 10 and a bottom copper layer 19. Circuit board 17 thus constitutes a DBC (direct-bonded copper) circuit board. Crystal array 14 can also be fastened to a heat sink 10 containing for example copper or another material that is a good thermal conductor. The pump optics 7, 8 can be fastened both to the copper layer 10 and to the ceramic layer 18.

It is further possible for the circuit board 17 to be made of or to contain copper or silicon. The crystal array 14 is preferably fastened to the substrate 17 by means of at least one of the following fasteners: glue, soft solder, hard solder.

Figure 6:
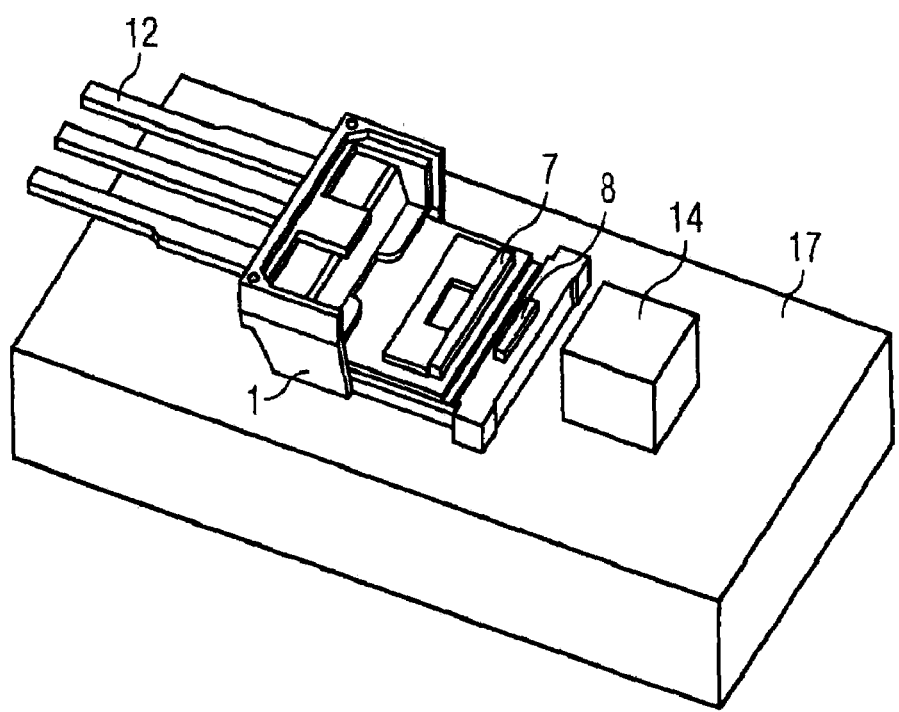
FIG. 6 is a schematic perspective diagram of a sixth exemplary embodiment of the laser device.

As can be appreciated from the perspective view of FIG. 6, the pump source 1 can for example be electrically contacted by means of connector pins 12, for example via a plug connection.

The length of the gain crystal 3 in the direction of the pump beams 2 is preferably between 0.5 and 2 mm. The length of the frequency conversion crystal is preferably between 2 and 5 mm. The overall length of the laser device is preferably between 5 and 20 mm.

Figure 7:
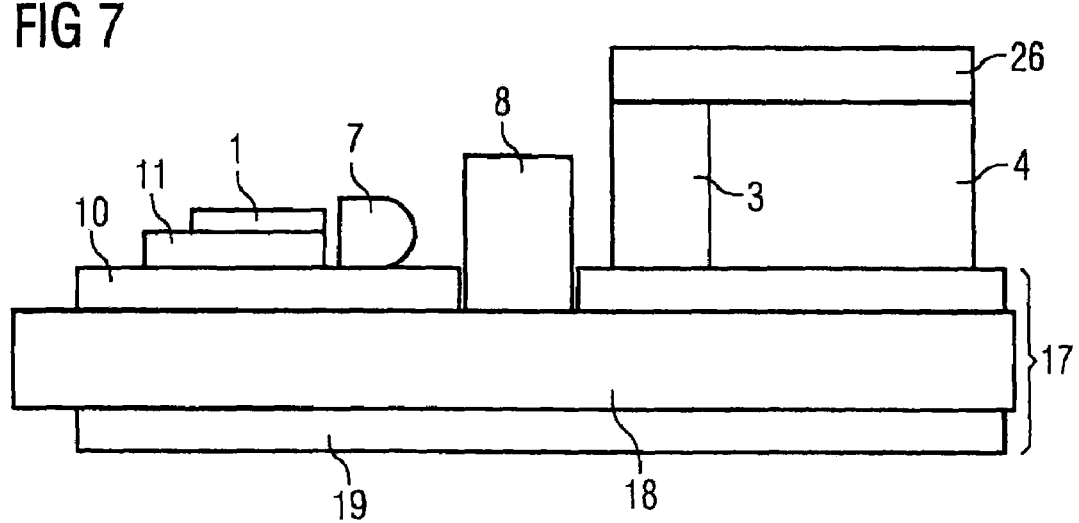
FIG. 7 is a schematic sectional diagram of a seventh exemplary embodiment of the laser device.

FIG. 7 is a schematic sectional view of a seventh exemplary embodiment of the laser device. Here, a heat-conducting element 26 is disposed on the crystal array 14. The heat-conducting element 26 contains or is formed of at least one of the following materials: copper, a copper composite material (DBC), silicon. The heat-conducting element 26 serves to improve the dissipation of the heat generated by the device during operation. It can for example be thermally coupled to a heat sink.

Heat-conducting element 26 is preferably fastened to crystal array 14 by means of one of the following fasteners: glue, soft solder, hard solder. If glue is used, it is preferably a particularly temperature-resistant glue.

Figure 8A:
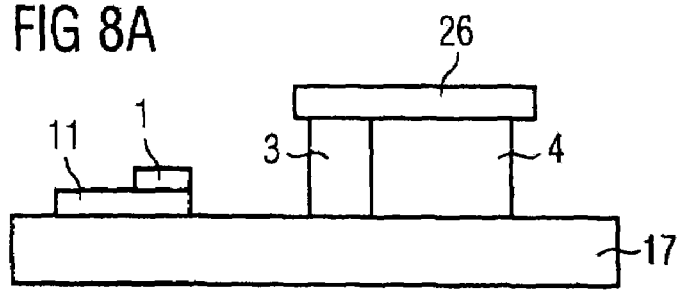
FIG. 8A is a schematic sectional diagram of an eighth exemplary embodiment of the laser device.
Figure 8B:
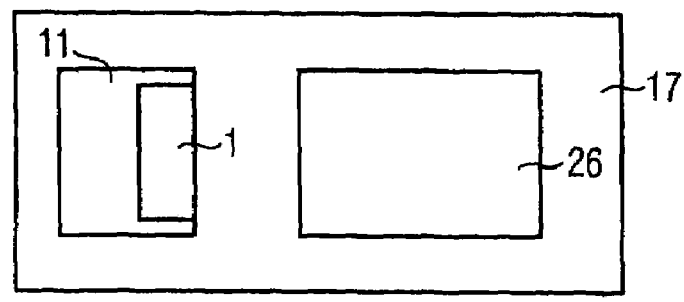
FIG. 8B is a schematic plan view of the eighth exemplary embodiment of the laser device.

FIG. 8A is a schematic sectional diagram of an eighth exemplary embodiment of the laser device. FIG. 8B schematically illustrates the associated plan view. Analogously to, for example, the exemplary embodiment of the laser device described in connection with FIG. 7, the laser device here comprises a pump source 1 that can be disposed on a heat sink 11. Pump source 1, together with heat sink 11, is mounted on and electrically connected to a circuit board 17. Circuit board 17 is formed for example by a DBC circuit board. It is further possible for circuit board 17 to be formed of silicon or another material that is a good thermal conductor, on which conducting paths can be structured for electrically contacting for example the pump source 1.

The laser device further includes a crystal array 14 comprising at least one gain crystal 3 and at least one frequency conversion crystal 4. The crystals of the crystal array 14 can for example be connected to one another by means of heat-conducting element 26. Heat-conducting element 26 is preferably made of or contains silicon.

Figure 8C:
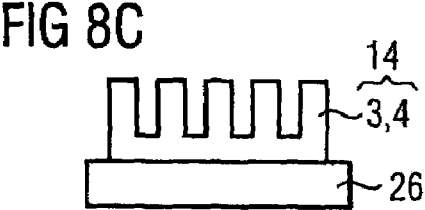
FIG. 8C is a schematic sectional diagram of a first exemplary embodiment of a crystal array for the eighth exemplary embodiment of the laser device.

FIG. 8C shows a first exemplary embodiment of a crystal array for the laser device described in connection with, for example, FIGS. 8A and 8B. In this exemplary embodiment of the laser device, the saw kerfs 9 of crystal array 14 do not extend all the way to heat-conducting element 26; hence, a coherent crystal array 14 implemented in one piece is fastened to heat-conducting element 26. That is, crystal array 14 is connected mechanically to heat-conducting element 26 and linked thermally to heat-conducting element 26.

Figure 8D:
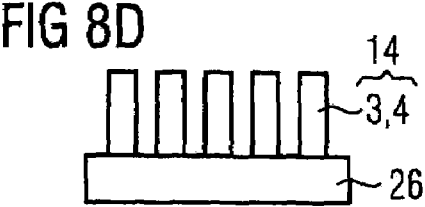
FIG. 8D is a schematic sectional diagram of a second exemplary embodiment of a crystal array for the eighth exemplary embodiment of the laser device.
Figure 8E:
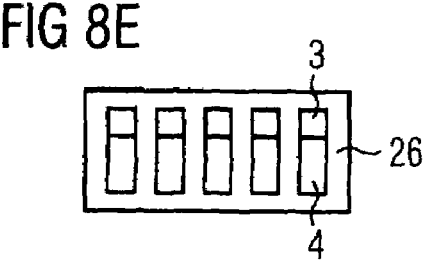
FIG. 8E is a schematic plan view of the crystal array according to the second exemplary embodiment.

FIG. 8D depicts a second exemplary embodiment of crystal array 14 in a schematic sectional diagram; FIG. 8E shows the associated schematic plan view. In this second exemplary embodiment of crystal array 14, the saw kerfs 9 extend all the way to heat-conducting element 26. These saw kerfs 9 can be produced before or after crystal array 14 is mounted on heat-conducting element 26. That is, in this exemplary embodiment the crystal array 14 is formed by a plurality of crystal composites, each comprising one gain crystal 3 and one frequency conversion crystal 4. The crystals in this case are connected mechanically to one another by means of heat-conducting element 26.

If the saw kerfs 9 are made before mounting on the heat-conducting element 26, it is possible for the individual crystal composites each comprised of one gain crystal 3 and one frequency conversion crystal 4 to be mounted individually on heat-conducting element 26. For this purpose, heat-conducting element 26 can be provided with alignment marks that enable the crystal composites to be positioned on heat-conducting element 26 in a passive mounting process. That is, the alignment and mounting of the crystal composites on heat-conducting element 26 is effected by lining the crystal composites up with the alignment marks.

Figure 9A:
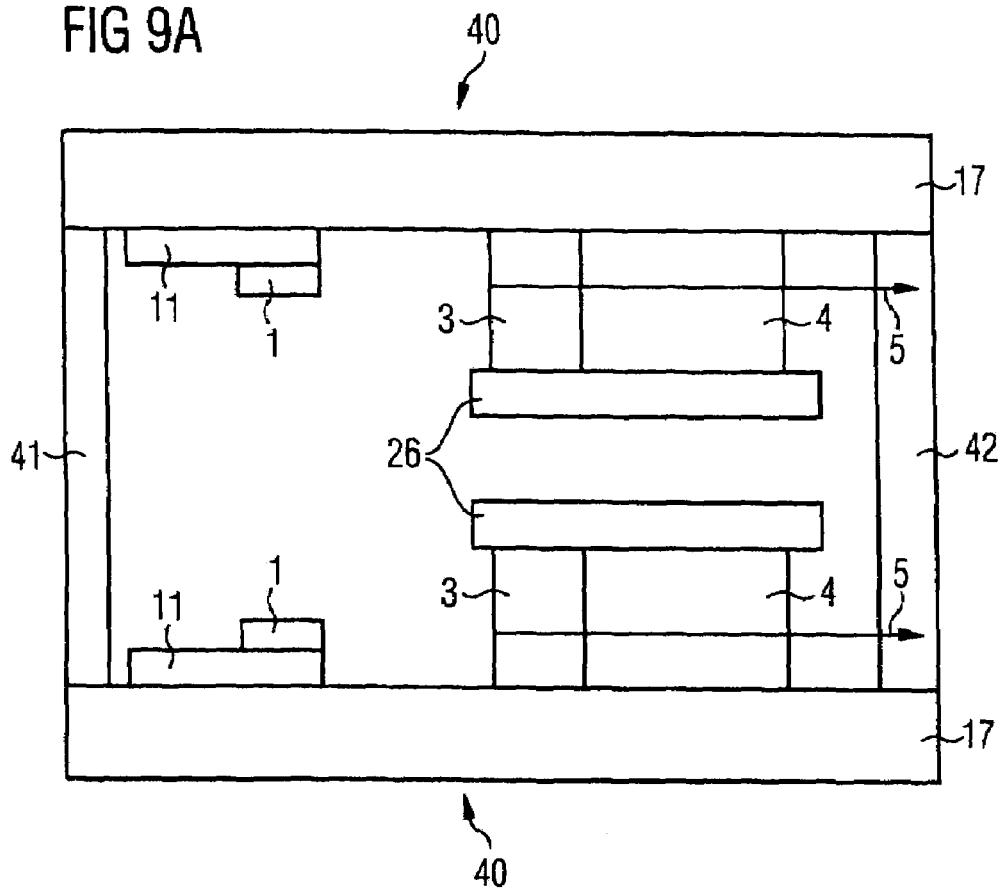
FIG. 9A is a schematic sectional diagram of a ninth exemplary embodiment of the laser device.

FIG. 9A is a schematic sectional diagram of a ninth exemplary embodiment of the laser device.

Figure 9B:
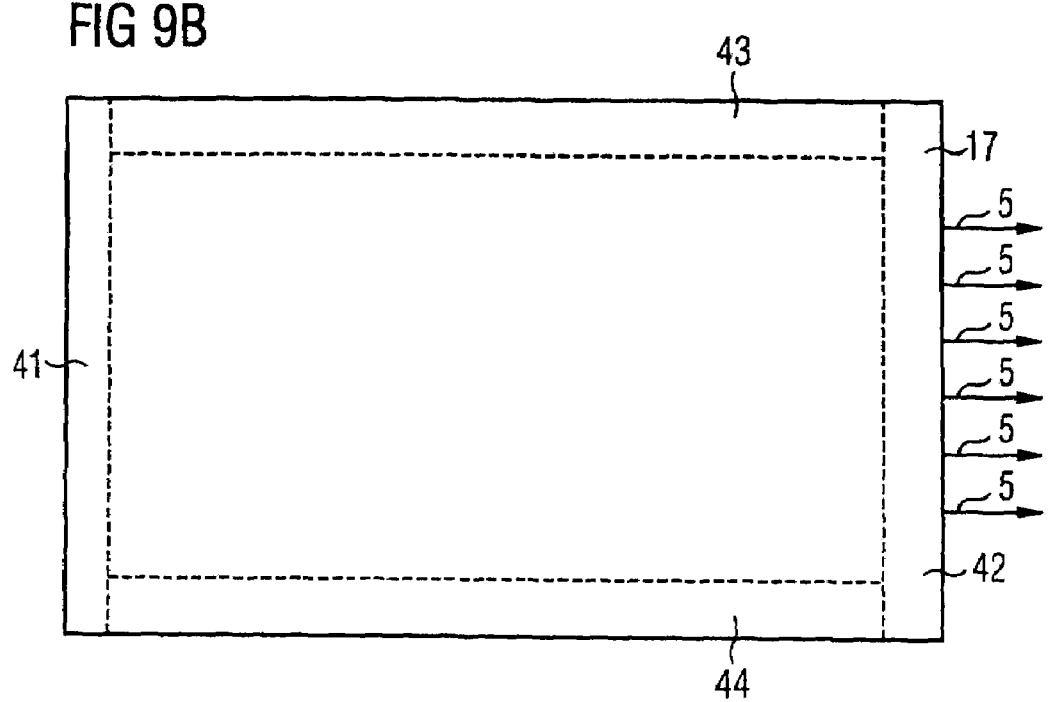
FIG. 9B is a schematic plan view of the ninth exemplary embodiment of the laser device.

FIG. 9B is a schematic plan view of the ninth exemplary embodiment of the laser device.

In the ninth exemplary embodiment of the laser device, two individual laser devices 40 of the kind explained in connection with one of the foregoing exemplary embodiments are arranged vertically one over the other. These two individual laser devices 40 are arranged such that active components such as for example the pump sources 1 face each other and the circuit boards 17 of the individual laser devices 40 extend parallel to each other, or substantially parallel to each other subject to production variations.

The individual laser devices 40 are for example arranged spaced apart from one another by means of spacers 41, 42, 43, 44. This makes it possible to dispense with the lateral spacers 43, 44 or front spacer 42 and back spacer 41. The spacers 41, 42, 43, 44 connect the individual laser devices 40 mechanically to one another. They can be formed for example of a glass or a semiconductor material. Front spacer 42, through which frequency-converted laser radiation 5 leaves the individual laser devices 40, can form an optical element. For example, front spacer 42 can serve to mix the laser radiation 5. A single laser beam can be formed from the individual laser beams 5 in this way.

The depicted stacking of the individual laser devices 40 makes it possible to scale the laser power in a second spatial direction. In addition to stacking two individual laser devices 40, it is also conceivable to stack a multiplicity of individual laser devices 40 in the manner shown.

Figure 10A:
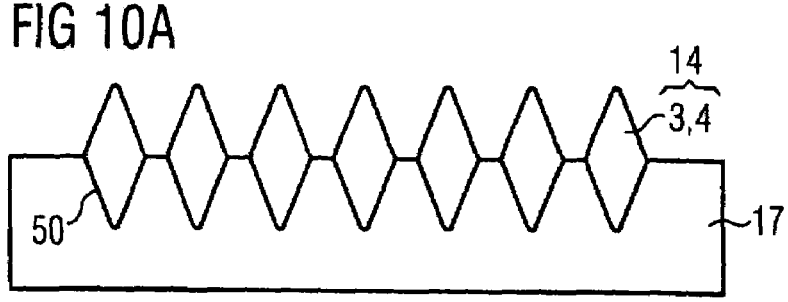
FIG. 10A is a schematic sectional diagram of the laser device according to a tenth exemplary embodiment.

FIG. 10A is a schematic sectional diagram of a tenth exemplary embodiment of the laser device. In the tenth exemplary embodiment, crystal composites each comprising a gain crystal 3 and a frequency conversion crystal 4 are seated in recesses in the circuit board 17. The circuit board 17 can in this case be made of or contain silicon, for example. The depth of the recesses 50 is preferably smaller than the height of the crystals 3, 4 of the crystal composite, causing the crystals 3, 4 to jut above the edge of the recess 50. The crystals of the crystal composite preferably overtop the edge of the recess 50 by at least 40% of their height.

The shape of the recesses 50 can be selected for example as U- or V-shaped in section. That is, the recesses 50 are then U- or V-shaped channels that are structured into circuit board 17 and extend at least for the length of the crystal composite. For example, the recesses 50 are structured into circuit board 17 by an anisotropic etching process.

Figure 10B:
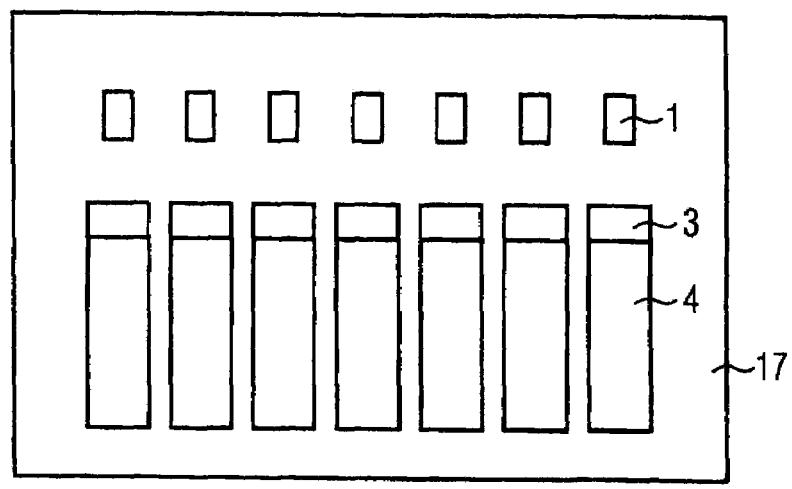
FIG. 10B is a schematic plan view of the laser device according to the tenth exemplary embodiment.
Figure 10C:
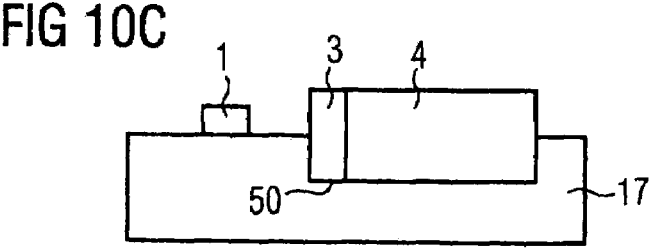
FIG. 10C is a schematic sectional diagram of the laser device according to the tenth exemplary embodiment.

As depicted in FIGS. 10B and 10C, pump source 1 can be fastened directly to circuit board 17, e.g. soldered thereto. Alternatively, however, as described in connection with the preceding exemplary embodiments, pump source 1 can be mounted on a heat sink 11 which in turn is fastened to circuit board 17.

Figure 10D:
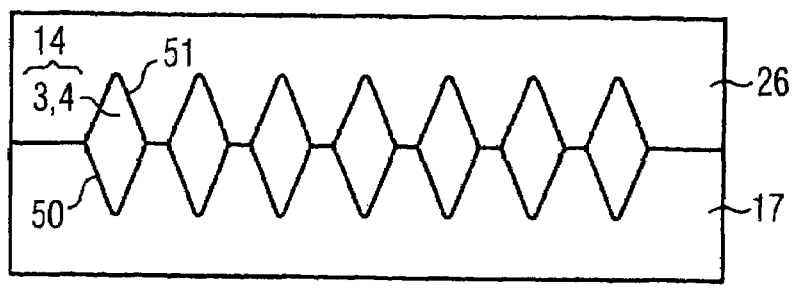
FIG. 10D is a schematic sectional diagram of a modification of the tenth exemplary embodiment of the laser device.
Figure 11A:
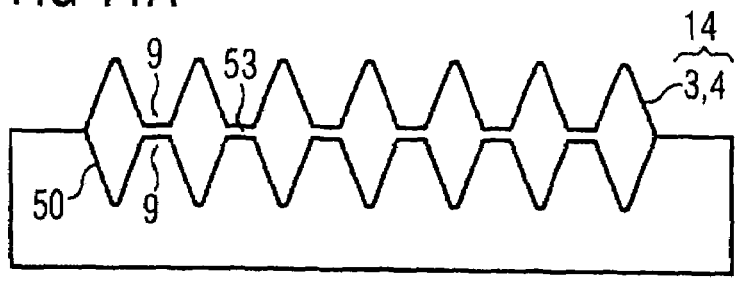
FIG. 11A is a schematic sectional diagram of an eleventh exemplary embodiment of the laser device.
Figure 11B:
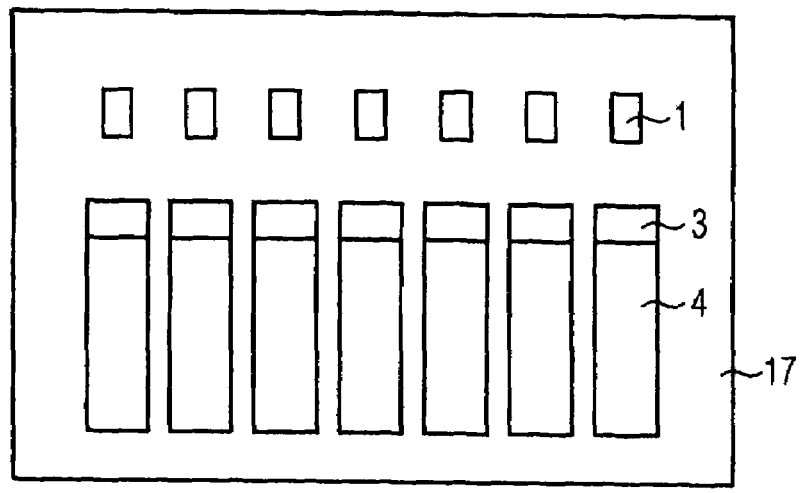
FIG. 11B is a schematic plan view of the eleventh exemplary embodiment of the laser device.
Figure 11C:
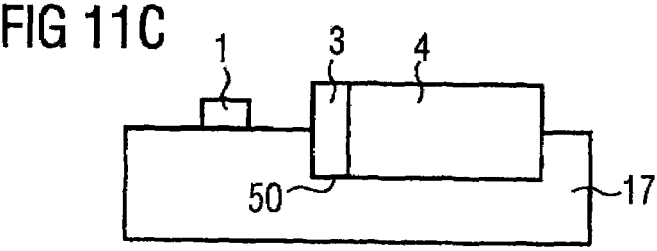
FIG. 11C is a schematic sectional diagram of the eleventh exemplary embodiment of the laser device.
Figure 11D:
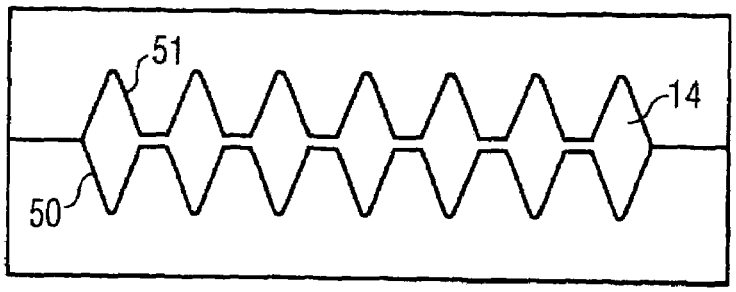
FIG. 11D is a schematic sectional diagram of a modification of the eleventh exemplary embodiment of the laser device.

According to the modification of the tenth exemplary embodiment of the laser device, described in connection with FIG. 10D, a heat-conducting element 26, made for example of the same material as the circuit board 17, can further be disposed on crystal array 14. Said heat-conducting element 26 can for example be a silicon wafer or a silicon strip in which recesses 51 are structured. That is, the recesses 51 are configured with respect to shape and size such that they embrace the crystal composites in as form-fitting a manner as possible. In this exemplary embodiment, the crystal array 14—except for radiation entrance face 3a and radiation exit face 4a—is surrounded as completely as possible by substrate 17 and heat-conducting element 26.

In contrast to the tenth exemplary embodiment of the laser device described in connection with FIGS. 10A to 10D, in the exemplary embodiment of the laser device described in connection with FIGS. 11A to 11D the crystal array 14 is not completely severed by saw kerfs 9, but rather, webs 53 remain. Thus, crystal array 14 is implemented in one piece in this exemplary embodiment.

Figure 12A:
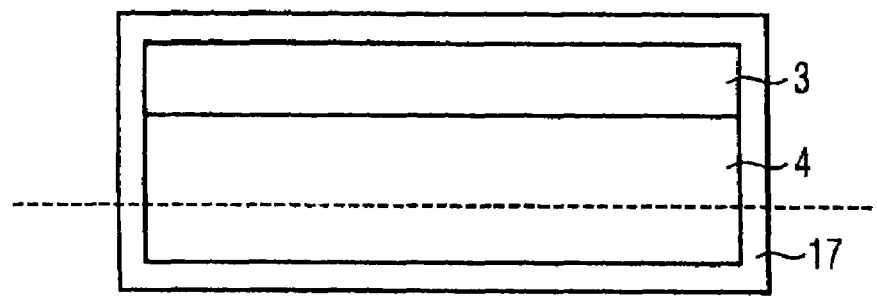
FIG. 12A is a schematic plan view the crystal array in a form in which it can be used in a laser device according to one of the above-described exemplary embodiments.
Figure 12B:
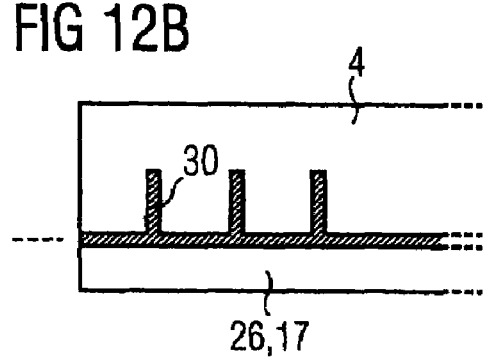
FIGS. 12B, 12C and 12D illustrate various ways of connecting a circuit board or a heat-conducting element to a crystal array.
Figure 12C:
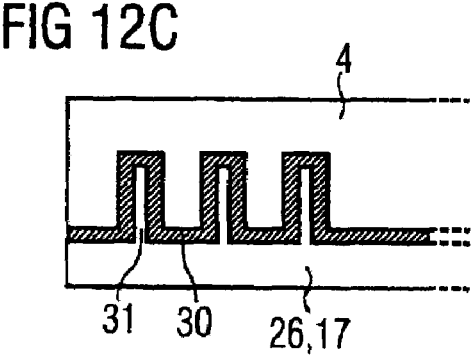
Figure 12D:
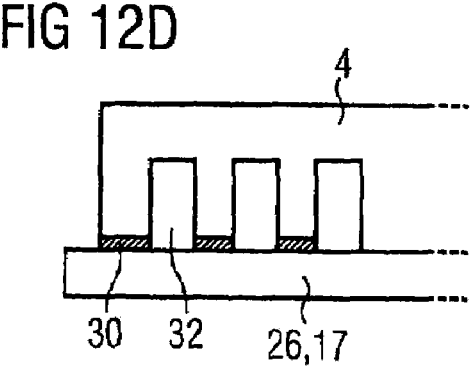

FIG. 12A is a schematic plan view of the kind of crystal array 14 that can be used in a laser device according to one of the above-described exemplary embodiments. FIGS. 12B, 12C and 12D illustrate various ways of connecting a circuit board 17 or a heat-conducting element 26 to a crystal array 14.

The exemplary embodiments described in connection with FIGS. 12B to 12D feature particularly good thermal linking of crystal array 14 to circuit board 17 and/or heat-conducting element 26.

In the exemplary embodiment described in connection with FIG. 12B, a filling and/or connecting material 30 is poured into the saw kerfs 9 of crystal array 14. Said filling material 30 can for example be an epoxy material that contains a thermally conductive filling such as thermally conductive metallic particles. Crystal array 14 is fastened to circuit board 17 or heat-conducting element 26 by means of filling material 30.

In the exemplary embodiment described in connection with FIG. 12C, circuit board 17 or heat-conducting element 26 has projections 31 that are configured for example as comb-like. The projections 31 are structured into the material of circuit board 17 or heat-conducting element 26 and are implemented in one piece therewith. The comb-like projections 31 engage in the saw kerfs 9 of crystal array 14. Crystal array 14 is connected to circuit board 17 or heat-conducting element 26 by means of a filling material 30, as described previously hereinabove.

In the exemplary embodiment described in connection with FIG. 12D, the saw kerfs remain unfilled. That is, the saw kerfs 9 are free of any filling and connecting material 30. In this exemplary embodiment, crystal device [sic] 14 can be cooled by the air flowing around crystal device 14.

Figure 13:
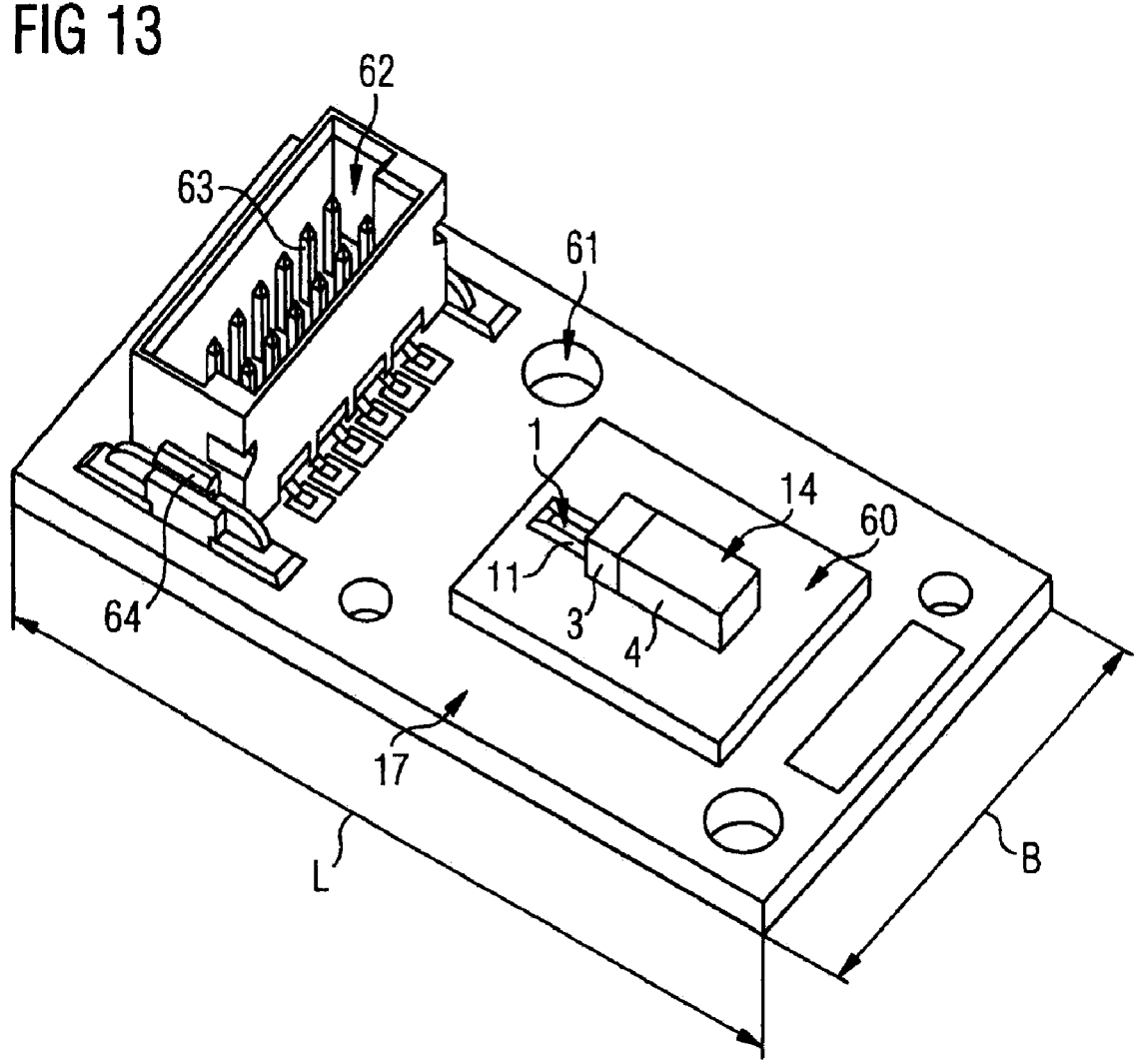
FIG. 13 is a schematic perspective diagram of a further exemplary embodiment of a here-described laser device.

FIG. 13 is a schematic perspective diagram of a further exemplary embodiment of a here-described laser device.

In the laser device according to the exemplary embodiment of FIG. 13, the circuit board 17 is a metal-core board. The metal-core board contains for example copper, aluminum and/or a ceramic material.

The circuit board 17 comprises bores 61. By means of the bores 61, for example the circuit board can be aligned on and mechanically fastened to a cooling element by press-fitting and/or screwing.

Disposed on the circuit board 17 is a heat-conducting element 60. Heat-conducting element 60 is preferably glued or soldered to circuit board 17. Heat-conducting element 60 is preferably made of or contains one of the following materials: aluminum nitride, silicon, DBC (direct-bonded copper) or another copper-ceramic composite material.

Disposed on the heating element is a pump source 1, which, as described previously hereinabove, may be fastened to an additional heat-conducting element 11. Disposed after pump source 1 in its direction of radiation is a crystal array 14 comprising at least one gain crystal 3 and at least one frequency conversion crystal 4. This crystal array 14 is configured according to one of the above-described exemplary embodiments.

The pump source 1 can for example be connected electrically conductively to circuit board 17 by means of vias or throughholes in heat-conducting element 60.

Components 64 that for example establish ESD [electrostatic discharge] protection for the pump source 1 can further be disposed on circuit board 17. Said components 64 can for example be constituted by at least one resistor and/or at least one varistor.

Electrical contacting of the laser device from outside the circuit board can be effected by means of the connector pins 63 of female socket 62.

There can further be disposed on the circuit board a control device—for example a microcontroller—which for example regulates and/or controls the current through pump source 1 in dependence on measured values such as the electrical resistance of the pump source 1 or the average temperature of the circuit board 17. Such regulating and control signals can also alternatively or additionally be impressed on the laser device by means of the connector pins 63.

The circuit board 17 of the laser device described in connection with FIG. 13 preferably has a length L of between 15 and 35 mm, preferably between 25 and 30 mm, for example 28 mm. The width B of the laser device is for example between 7 and 20 mm, preferably between 12 and 17 mm, for example 15 mm.

This patent application claims the priority of German Patent Application 102005015148.5-54, whose disclosure content is hereby incorporated by reference.

The invention is not limited by the description with reference to the exemplary embodiments. Rather, the invention encompasses any novel feature and any combination of features, including in particular any combination of features recited in the claims, even if that feature or that combination itself is not explicitly mentioned in the claims or exemplary embodiments.

What is claimed is:

1. A laser device, comprising:
   a crystal array comprising a laser gain crystal and an optically nonlinear frequency conversion crystal; and
   a pump source suitable for coupling at least two mutually spatially separated pump beams into said crystal array,
   wherein said crystal array comprises, between two neighboring pump beams coupled into said crystal array, a saw kerf extending parallel to said neighboring pump beams.

2. The laser device as in claim 1, wherein said saw kerfs extend over the full length of said crystal array.

3. The laser device of claim 1, wherein the crystal array is configured to form a laser resonator for multiple laser beams, and the saw kerf is configured to thermally decouple individual neighboring laser beams from each other.

4. The laser device of claim 1, wherein the distance between two adjacent saw kerfs is between 400 μm and 500 μm and the width of at least one of the saw kerfs is between 125 μm and 175 μm.

5. The laser device of claim 1, wherein a thermally conductive filling material is provided within at least one of the saw kerfs.

6. The laser device of claim 5, wherein the filling material comprises an epoxy material and a thermally conductive filler.

7. The laser device of claim 5, further including a substrate and wherein the filling material mechanically fastens the crystal array to the substrate.

8. The laser device of claim 5, further including a heat conducting element and wherein the filling material mechanically fastens the crystal array to the heat conducting element.

9. The laser device of claim 1, wherein said crystal array comprises a saw kerf between every two neighboring pump beams extending parallel to said neighboring pump beams.

10. A laser device, comprising:
    a crystal array comprising a laser gain crystal and an optically nonlinear frequency conversion crystal;
    a pump source suitable for coupling at least two mutually spatially separated pump beams into said crystal array;
    a substrate;
    wherein said crystal array comprises, between two neighboring pump beams coupled into said crystal array, a saw kerf extending parallel to said neighboring pump beams,
    a thermally conductive filling material is provided within at least one of the saw kerfs, the filling material mechanically fastens the crystal array to the substrate, and the substrate is configured to have at least one protrusion engaging in at least one saw kerf of the crystal array.

11. A laser device, comprising:

a crystal array comprising a laser gain crystal and an optically nonlinear frequency conversion crystal;

a pump source suitable for coupling at least two mutually spatially separated pump beams into said crystal array;

a heat conducting element;

wherein said crystal array comprises, between two neighboring pump beams coupled into said crystal array, a saw kerf extending parallel to said neighboring pump beams, a thermally conductive filling material is provided within at least one of the saw kerfs, the filling material mechanically fastens the crystal array to the heat conducting element, and the heat conducting element is configured to have at least one protrusion engaging in at least one saw kerf of the crystal array.

12. A laser device, comprising:

a crystal array comprising a laser gain crystal and an optically nonlinear frequency conversion crystal;

a pump source suitable for coupling at least two mutually spatially separated pump beams into said crystal array, and a substrate or a heating conducting element, wherein said crystal array comprises, between two neighboring pump beams coupled into said crystal array, a saw kerf extending parallel to said neighboring pump beams, and wherein the substrate or the heat conducting element is configured to have at least one protrusion engaging in at least one saw kerf of the crystal array.

13. The laser device of claim 12 in which the laser device comprises the substrate and the heating conducting element, wherein the substrate and the heat conducting element are configured to have at least one protrusion engaging in at least one saw kerf of the crystal array.

* * * * *

UNITED STATES PATENT AND TRADEMARK OFFICE
CERTIFICATE OF CORRECTION

PATENT NO. : 7,729,046 B2  Page 1 of 1
APPLICATION NO. : 12/170238
DATED : June 1, 2010
INVENTOR(S) : Michael Kuhnelt It is certified that error appears in the above-identified patent and that said Letters Patent is hereby corrected as shown below:

Column 18,
Line 7, replace "heating" with -- heat --.

Column 18,
Line 17, replace "heating" with -- heat --.

Signed and Sealed this

Seventh Day of September, 2010

David J. Kappos
*Director of the United States Patent and Trademark Office*